Feb. 11, 1947.  J. R. BOWMAN  2,415,411
METHOD OF AND APPARATUS FOR HIGH VACUUM DISTILLATION
Filed March 30, 1942  2 Sheets-Sheet 2

Inventor
JOHN R. BOWMAN,
By G. M. Houghton
his Attorney

Patented Feb. 11, 1947

2,415,411

UNITED STATES PATENT OFFICE 2,415,411

METHOD OF AND APPARATUS FOR HIGH VACUUM DISTILLATION

John R. Bowman, Pittsburgh, Pa., assignor to Gulf Research & Development Company, Pittsburgh, Pa., a corporation of Delaware Application March 30, 1942, Serial No. 436,884

10 Claims. (Cl. 202—40)

1

This invention relates to methods of and apparatus for high vacuum distillation.

In conventional column stills and rectifying columns, a long column is provided extending up from a heated kettle, and cooled at the top so as to condense at that point all or part of the vapors rising from the kettle. Condensed material flows down the column. Countercurrent contact devices, such as vertically spaced perforated bubble plate assemblages or a collection of balls or rings, are installed in the column to assure intimate contact between the downcoming (reflux) liquid and the rising vapor. At each plate, the liquid is stripped of relatively low boiling point components and the vapor is stripped of high boiling point components. The liquid leaving each plate is richer in high-boiling components than the liquid entering each plate, and conversely for the vapor. Plates are not 100 per cent efficient; liquid and vapor do not come to complete equilibrium therein, but with a sufficient number of plates separation can be attained to any degree desired. The distillate vapor proper passes the condensing zone described and is condensed outside the column proper.

Such stills have been developed to a high efficiency for distillation at atmospheric pressures and above, and at moderate sub-atmospheric pressures, but the expedients upon which they are based are of no use when really high vacua are concerned; vacua represented by absolute pressures of the order of one millimeter of mercury or less (atmospheric pressure equals 760 millimeters). Thus they are not useful for distilling substances which have to be distilled under high vacuum in order to avoid decomposition thereof; for example, certain high melting point paraffin waxes which decompose on attempting to boil them under ordinary pressures.

There are several reasons why use of bubble plate or packed columns is not feasible in high vacua. The pressure drop of fluids flowing through such columns operating at a high vacuum would be of such a magnitude that no flow would result. Furthermore, because the viscosity of a gas or vapor is independent of its pressure, the flow through a packed column, in terms of pounds per hour, would be impractically small. Moreover, the vapor density of substances at these low pressures (one millimeter or less) would be reduced about a thousand-fold compared to barometric densities, and hence the contact surface required would have to be increased an equal

2 ratio, and the huge size of such a column would preclude its use.

Accordingly, to obtain pure products in high vacuum distillation it has been necessary to employ plural distillations in simple (non-rectifying) stills, which has numerous disadvantages.

Among the objects of the present invention are the provision of a distillation apparatus and method, applicable to use within a range of very high vacua, in which the effects of rectification are achieved artificially by introducing multiple zones of alternate evaporation and condensation, at spaced intervals along a columnar rectification zone. Another object is the provision of a high-vacuum distillation apparatus of the character described, capable of achieving, in a single apparatus, a degree of separation hitherto unattainable except by multiple distillation.

As used in the following description, the term "column" is a general designation of rectifying devices and is not to be understood as restricted to the conventional countercurrent contactors to which the word is generally applied. "Rectification" as used in this description is the process of enriching vapor produced in a still pot or equivalent apparatus, as is ordinarily accomplished by countercurrent contacting of the vapor with part of its own condensate, usually, and herein, termed the "reflux."

According to the invention there is provided an apparatus comprising a kettle and an elongated column (the diameter of which is critical, as explained below) rising from the kettle and communicating with a vacuum pump. The column may be provided with partial condensation means near the top, or other device to afford reflux, and total condensation means thereabove to liquefy the distillate vapors. At spaced intervals along the column are partial-vaporization zones, afforded by heating means spaced along the column, and alternating therewith along the column are partial-condensation zones, afforded by suitable cooling means. Each pair of evaporation-condensation zones performs the functions of a plate, in stripping low-boiling point components out of the downflowing (reflux) liquid and in stripping high-boiling point components out of the vapor stream. As a matter of fact, this arrangement is so efficient that in many cases each such pair is more than equivalent to one ideal plate. By suitable control of the temperatures in the several zones, as described in detail below, sharp separations can be effected, comparable with the separations attained in atmospheric-pressure column stills. Thus the invention provides a relatively simple high-vacuum apparatus and method, capable of achieving results hitherto obtainable only with complex multiple still set-ups, yet requiring but a single compact space to be kept under vacuum.

In the accompanying drawings there is shown more or less diagrammatically an example of a specific embodiment of the invention, and three modifications thereof. In the drawings, Fig. 1 is a view of a complete apparatus in elevation;

Figure 1:
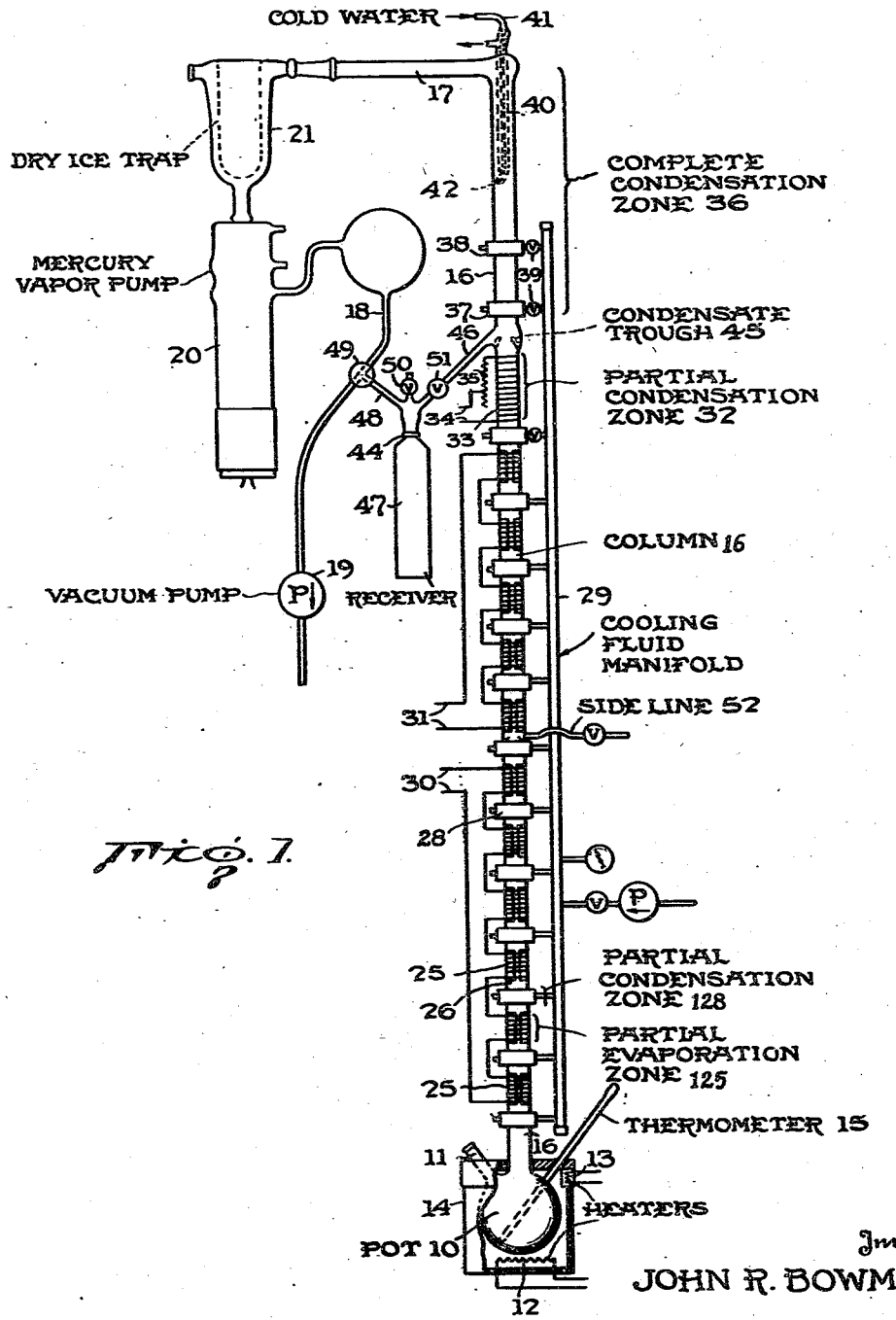
Figure 2:
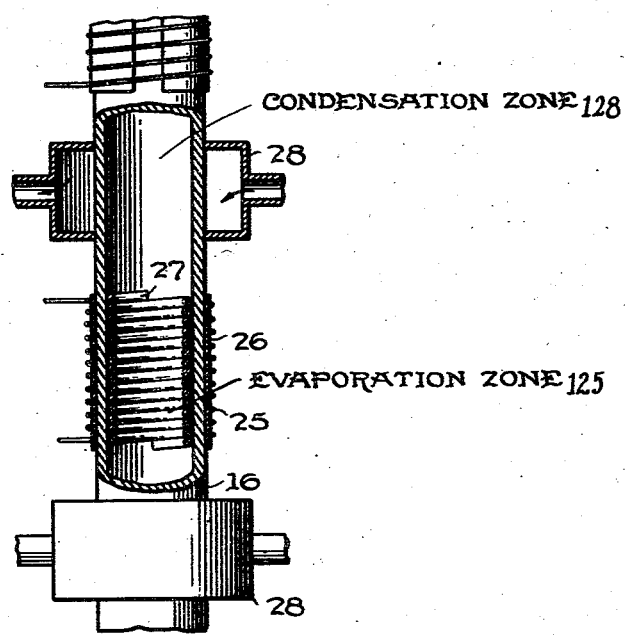
Fig. 2 is a fragmental view, partially in central vertical section and partly in elevation, to an enlarged scale, of one of the vaporizing-condensing combinations of the apparatus of Fig. 1.

Referring to the drawings, a still pot 10 is provided, having filling means 11 and heated electrically by a lower heater 12 and upper heater 13, all enclosed in a jacket 14. This heater arrangement is advantageous as it makes for uniform heating of the pot but other types of heaters can be used if desired. A thermometer 15 for the pot is conveniently provided, in a way known per se.

Extending upwardly from the pot is a tube or column 16, in communication through conduits 17 and 18 with a high-vacuum mechanical type vacuum pump 19, capable of maintaining at the cold end of the total condenser (see below) a vacuum equivalent, say, to 10 to 100 microns of mercury (0.01 to 0.1 millimeter) absolute pressure. A mercury vapor diffusion pump 20 is installed as shown to permit operation at higher degrees of evacuation if desired, and a trap 21 is provided, filled with dry ice (not shown) to condense any light volatiles that may escape the column.

The column is provided with about twelve similar, equally spaced heating means 25, shown as coils of resistance wire wrapped around the outside of the column with an interposed layer of asbestos paper 26. Within the column and pressed against the walls thereof opposite the coils are helices of incorrodible wire 27, which serve to delay passage of downcoming liquid through the evaporation (heating) zones. These delay devices can be omitted, with some sacrifice in separating efficiency, in cases where it is desired to reduce holdup of the reflux stream.

Alternating with the evaporation zones 125 corresponding to heaters 25, is a plurality of condensation zones 128, afforded by spaced cooling means shown diagrammatically and by way of example as jackets 28 supplied with cooling fluid (liquid or gas) at a suitable temperature and flow rate, from a manifold 29, as shown.

The set of heating coils 25 is conveniently though not necessarily supplied with current from two separate circuits as shown at 30 and 31, to permit independent adjustment, though ordinarily each coil is supplied with equal current, to produce the same amount of heat. Equal distribution of cooling fluid to the cooling means is assured by the manifold arrangement shown.

The portion of the column directly above the uppermost cooling zone constitutes a partial condensing zone 32, for the purpose of obtaining reflux liquid and controlling the reflux ratio, as described in detail below. Complete condensation is prevented in this zone when collecting distillate, by supplying heat through a coil 33, somewhat longer than coils 25 as shown, and supplied from a separate circuit 34 with current regulating means 35. The amount of vapor condensed in zone 32 is determined by this adjustment.

Above zone 32 is the total condensing zone 36, maintained with the aid of cooling means 37 and 38 controlled by valves 39. Any vapor not condensed by the action of these cooling means is condensed by an internal chilling means 40 of construction apparent from the drawings, supplied with cold fluid at 41 and arranged at its lower end 42 to allow condensate to drip down the walls of the column.

Condensate is collected at an annular trough 45 located in the column below the total condensing zone. Condensate flows through outlet 46 valved at 51 to a receiver 47, maintained under vacuum by a branch 48 communicating through a three-way valve 49 with exhaust conduit 18, as shown. A detachable hermetically sealable joint is indicated at 44. Valves 49, 50 and 51 with their connections constitute a so-called Thorne or Smith triangle. By suitable manipulation thereof the receiver 47 can be removed and an empty one installed, without breaking the vacuum in the main part of the system or interrupting distillation.

In typical modes of operating the still, the charge (distilland) is melted if necessary and poured in the pot, the vacuum pump or pumps are operated to exhaust the apparatus and the pot heaters are turned on. When the first condensation is observed at the base of the column, the set of heaters 25 is turned on at low heat. As the vapor rises in the column, the heaters 25 are adjusted to a higher temperature, and when condensation is observed at the base of the partial condensing zone 32 the cooling means are put in operation. Usually the partial condenser 32 is adjusted to give total reflux for a while before any distillate is collected.

Distillation is now carried on. Distillate is condensed and flows into the receiver.

Advantageously the degree of vaporization and condensation at each heating and cooling zone is made substantially equal; that is the rate of heat abstraction at the cold zones 128 is made substantially equal to the rate of heat supply at zones 125. The desired condition is most easily determined by measuring the thickness of the reflux stream adjacent the several zones and adjusting the supply of cooling fluid to the cold zones until the reflux streams entering the hot (or cold) zones are substantially equal in thickness. If the column is a glass tube this measurement can be made with the aid of an optical-glass thickness gauge, which in this case measures the thickness between the outer wall of the column and the inner surface of liquid flowing down it. In the case of columns made of opaque material, windows can be provided or other expedients can be employed.

Considering the operation of the still: as the film of reflux traverses each heat input zone, partial evaporation takes place; low-boiling point components are vaporized and by virtue of the high vacuum in the column, they almost instantly diffuse into the vapor stream, forming a homogeneous vapor mixture in this zone. The reflux film leaving the bottom of each heat input zone is reduced in thickness, i. e. in amount, and contains relatively less of the more-volatile constituents than when it entered the zone. Conversely, at each heat abstraction zone partial condensation occurs, in the (homogeneous) vapor stream rising from the next lower heat input unit. Diffusion of the condensed vapors into the reflux liquid is prompt, by reason of the thinness of the reflux film. The vapor stream leaving each heat abstraction zone is impoverished with respect to less-volatile constituents.

In short, the hot zones strip light components out of the reflux stream and the cold zones condense heavy components out of the vapor stream.

It appears that very little diffusion takes place in the reverse directions; rather, the interphase transfers, liquid-to-vapor or vapor-to-liquid, are unidirectional. Reverse action is disfavored by the superheating which obtains in the hot zones; the cooling at zones 128 which avoids evaporation of the reflux film passing thereover; and by the very slow rate of spontaneous approach to vapor-liquid equilibrium, which obtains under the high vacua involved.

Since the rate of heat supply at the hot units is maintained approximately equal to the rate of heat abstraction at the cold units, the system is approximately adiabatic when summed over a hot-cold pair (or over the set of hot-cold pairs). Strictly adiabatic operation gives the best possible operation, but is not necessary.

Under exactly adiabatic conditions the rate of vaporization in the heated zones will not in general equal the rate of condensation in the cooled ones, because the compositions of the materials undergoing interphase transfer will be slightly different and their components will generally have different heats of vaporization. Practically, however, the difference is so small that by equalization of the reflux streams entering the hot (or cold) zones as described, approximately adiabatic operation is obtained.

Strictly speaking, the significant physical quantity which changes at the several heat transfer zones is enthalpy (total heat). Since the pressure involved is so small, the expression for enthalpy reduces to simply the internal energy of the fluids involved, and for the present purposes a change in enthalpy reduces itself to the integral of the specific heat over the temperature range in question, with any latent heats of transition added.

For best separation, the hot zones should be held at the maximum temperature that the reflux material will stand without pyrolysis (the cold zones being cooled at such a rate that overall adiabatic operation obtains). Where poorer separation is permissible more economical operation may be obtained by reducing the temperature of the hot zones and the rate of heat extraction from the cold ones.

The reflux ratio, that is the ratio of distillate refluxed to distillate withdrawn from the still, has a profound effect on the sharpness of separation. The efficiency of a hot-cold pair compared to that of a theoretical plate at the same reflux ratio increases rapidly as the reflux ratio is diminished and can reach values of the order of three. Therefore, substantially smaller reflux ratios can be employed than with ordinary columns; a value of ten gives nearly as good separation as total reflux, even with relatively long columns.

Finally, the separation increases without limit as the ratio of throughput to vaporization and condensation (in the hot and cold zones respectively) is decreased. As a consequence, at low throughput exceedingly sharp separations may be made, even with relatively short columns, if the heat transfers are large.

Ordinarily, with a sufficiently large vaporization-condensation ratio (such as normally obtains in using the still) each hot-cold pair is equivalent to more than one (e. g. 1.5) theoretical plate. The equivalence is not linear; it increases slightly with the number of pairs in the column. For example, with an efficiency as above the 12-pair column shown is equivalent to more than 18 plates.

The limit of separation efficiency for a given flow rate is set by the Langmuir formula applied at the temperature of incipient pyrolysis. This formula which is well known in the art of molecular distillation is usually written:

$$n = PS(1/2\pi MRT)^{1/2}$$

where $n$ is the distillation rate in moles per second, $P$ is the vapor pressure, $S$ the area of exposed surface, $M$ the molecular weight, $T$ the absolute temperature and $R$ the ideal-gas constant. It gives the maximum possible rate of evaporation of a liquid, for the case when no return condensation takes place, as when the liquid evaporates into a very high vacuum or when it is strongly superheated. While return condensation to the film is not wholly suppressed in the present column, it is very largely suppressed, and the formula applies. The formula gives an upper bound for the rate at which material may be vaporized in the hot zones, hence a limit for the vaporization-condensation ratio for a given total flow. As stated, the separation may be increased without limit by reduction of the total flow provided the hot zones do not wholly vaporize the reflux stream.

Thus, to sum up, in operating the still, if a sharply separated (pure) product is desired, the throughput is made small, by heating the pot 10 at a relatively low rate, and the reflux ratio is made moderately large, by suitable adjustment at zone 32. Conversely, if a distillate of less than maximum purity is acceptable, the throughput may be increased and the reflux ratio reduced. In all cases the heaters 25 are adjusted to rates appropriate to the volatilities of the components of the distilland in question (with due regard for the decomposition temperatures thereof) so that a continuous film of reflux will be maintained down the column, and the coolers 28 are correspondingly adjusted as described.

In some cases, as in distillation of wide boiling mixtures, it is advantageous to apply slightly more heat to the lower zones than the upper. Again, in certain cases (e. g. distillation of very high boiling waxes), in starting up it is advantageous to turn on the heaters 25 one after the other from the bottom up; in other words, heat is applied only to those evaporation zones which the vapor (and hence the reflux) has reached. This avoids on the one hand any overheating by application of full heat to dry zones, and on the other, total reflux of vapors in the lower part of the column due to insufficient heat. In such operations the distillation proper is carried out with substantially equal heat input to the zones as described.

My method is applicable to continuous as well as to batch operation, and to use of side feed lines and side product lines in a manner analogous to ordinary rectifying practice. In the drawings a side line is indicated at 52. Additional such lines can be employed as desired.

The absolute dimensions of the apparatus, and in particular the diameter of the column, are important, being determined by the pressure and the vapor velocity. The bore of the column is made such as to afford adequate mixing of the vapors in the hot zones, and sufficiently effective partial condensation in the cold zones. This requires that the diameter of the column (or the short dimension in the case of non-circular columns) be definitely greater than the mean free path of the molecules in the vapor, at the pressure used, but not extremely great compared to the mean free path. If the bore is less than the mean free path, throughput is considerably reduced by reason of the pressure drop in the column, while if the bore is excessively great the vapor velocity (and hence the throughput) must be reduced to allow the mixing and diffusion necessary for full efficiency of separation.

In a typical embodiment of the invention such as that shown in the drawings, useful for preparation of pharmaceuticals and the like under vacua of the order of 0.1 to 0.01 millimeter of mercury, the still pot may have a capacity of 2 liters, and the column may be 150 cm. long and of 3.5 cm. internal diameter, with heated zones 5 cm. long and cooled zones 7.5 cm. long. Under typical operating conditions such apparatus has a throughput of about 100 milliliters an hour.

In referring to operating pressures, pressures measured at the cold end of the total condensing zone 36 (i. e. in conduit 17) are meant. The pressure drop in the column appears to be relatively small, as the rate of distillation is observed to be very sensitive to fluctuations in the pressure maintained on the column at 17. Were the pressure drop large such fluctuations would be small compared to the working pressure in the still pot, and would not affect the distillation rate strongly.

Figure 3:
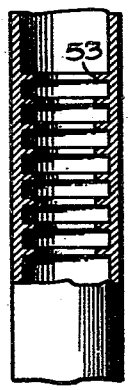
Fig. 3 is a view in vertical section of a modified form of column, with internal fins to increase the heat transfer surface.
Figure 4:
Fig. 4 is a view in horizontal section of a modified column of oblong cross section.
Figure 5:
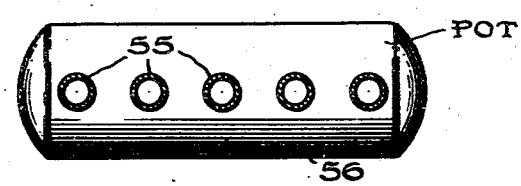
Fig. 5 is a similar view of another modified column construction, employing multiple columns.

To secure greater capacity, a column of greater diameter can be provided, advantageously with radial fins to increase the evaporative surface area, as indicated at 53 in Fig. 3 which is a central vertical section of such a tube. Or the column can be elongated laterally in one dimension so to speak; that is, a column of narrow oblong cross section can be employed, as at 54 in Fig. 4. Or several small tubes 55 can be used in parallel, leading from the same pot 56; Fig. 5. This is convenient in glass apparatus.

Ordinarily large columns are unnecessary as the apparatus finds its most important use in preparation of concentrates, fine chemicals, etc., where quantities involved are small.

The length of the column has no relation to the throughput, its value being determined by the degree of separation required.

The apparatus can be embodied in any suitable material, as determined by considerations known in ordinary distillation practice. It is often convenient to embody the entire still in glass.

What I claim is:

1. In distillation methods wherein a column is maintained at a high degree of vacuum and a liquid reflux is established in the column countercurrent to a rising vapor stream, the improvement which comprises supplying heat to, and abstracting heat from, the column at a plurality of alternate, spaced, and freely communicating zones, at such rates as respectively to cause partial evaporation of the reflux and partial condensation of the vapor stream at each respective zone, and causing vapors formed in the heat supply zones to mingle promptly with the adjacent vapor stream, and condensate formed in the heat abstraction zones to mingle promptly with the adjacent reflux.

2. In distillation methods wherein a liquid reflux is established in a column countercurrent to a rising vapor stream, the improvement which comprises supplying heat to, and abstracting heat from, the column at a plurality of alternate, spaced zones which are in unobstructed communication with each other, at such rates as respectively to cause partial evaporation of the reflux and partial condensation of the vapor stream at each respective zone, maintaining the column under high vacuum whereby vapors formed at the heat input zones promptly diffuse into the vapor stream, and maintaining the reflux liquid in a thin film so that condensate formed at the heat abstraction zones promptly diffuses into the reflux.

3. In distillation methods wherein a column is maintained at a high degree of vacuum and a liquid reflux is established in the column countercurrent to a rising vapor stream, the improvement which comprises supplying heat to the column at a plurality of zones at spaced intervals along the column and abstracting heat from the column at a plurality of spaced zones alternate with said heated zones, at a rate approximately equal to the rate of heat supply to the heated zones, the said zones for supplying and abstracting heat being in unobstructed communication with each other and affording large interfacial area between the vapor and liquid phases.

4. A method of high vacuum distillation which comprises sending an unimpeded stream of distillate vapors up a column in substantially undeviating flow, at least partially condensing vapors in the upper part of the column, to form a reflux liquid stream running down the entire length of the column, subjecting the column to high vacuum at the cold end of the condensation zone, supplying heat at a plurality of spaced zones up the column at a rate such as to cause partial evaporation of reflux liquid at said zones, with immediate commingling of the evaporated part with the vapor stream rising past said zones, and abstracting heat from the column at a plurality of spaced zones alternate with said heat zones, at a rate approximately equal to the rate of heat supply to said partial evaporation zones, such as to cause partial condensation in the vapor stream passing said heat-abstraction zones with immediate commingling of the condensed part of the vapor and the reflux stream passing said heat-abstraction zones.

5. A method of high vacuum distillation which comprises sending an unimpeded stream of distillate vapors up a column in substantially undeviating flow, partially condensing vapors leaving the top of the column, to form a reflux liquid stream down the entire length of the column, totally condensing vapors passing beyond the zone of partial condensation and recovering the condensed vapors, subjecting the column to high vacuum at the cold end of the total condensation zone, supplying heat at a plurality of zones spaced at intervals up the column at a rate such as to cause partial evaporation of reflux liquid at said zones, with immediate commingling of the evaporated part with the vapor stream rising past said zones, and abstracting heat from the column at a plurality of spaced zones alternate with said heat zones, at a rate such as to cause partial condensation in the vapor stream passing said heat-abstraction zones, with immediate commingling of the condensed part of the vapor and the reflux stream passing said heat-abstraction zones.

6. A high vacuum still comprising a column, exhausting means communicating with the column and a still pot adapted to deliver vapors to the column adjacent its bottom, partial-condensing means adjacent the top of the column adapted to condense at least part of the vapors and to return condensate as reflux down the column, means providing a plurality of spaced evaporating zones at intervals up the column, means providing a plurality of spaced condensing zones at intervals up the column alternating with the evaporating zones and communicating freely therewith, the said alternating evaporating and condensing zones being arranged to afford a substantially unimpeded and undeviated counterflow of vapor and reflux therethrough, and means for supplying heat to said evaporating and last-named condensing means at rates such that the reflux passing each evaporating zone is in part evaporated and vapors passing up by each condensing zone are in part condensed.

7. A high vacuum still comprising a column, exhausting means communicating with the column and a still pot adapted to deliver vapors to the column adjacent its bottom, partial-condensing means near the top of the column adapted to condense a portion of the vapors and to return the condensate as reflux down the column, total condensing means at the top of the column, means for drawing off condensate formed by said total condensing means, and a plurality of spaced heating column means along the column in unimpeded communication with a plurality of spaced column-cooling means also along the column in alternate relation to the heating means.

8. In distillation methods wherein a column is maintained at a high degree of vacuum and a liquid reflux is established in the column countercurrent to a rising vapor stream in substantially unimpeded flow through the column, said reflux being generated by condensation of at least part of said rising vapor stream, the improvement which comprises supplying heat to, and abstracting heat from, the column in such manner as to cause vaporization and condensation, the vapor and liquid so formed being constrained to commingle with the main vapor and reflux streams, respectively, both directly and as rapidly as formed.

9. In distillation methods wherein a column is maintained at a high degree of vacuum and a liquid reflux is established in the column countercurrent to a rising vapor stream, the reflux being generated by condensation of at least part of the rising vapor stream, the improvement which comprises supplying heat to, and abstracting heat from, the column in such manner as to cause vaporization and condensation, the vapor and liquid so formed at all points being constrained to commingle with the main vapor and reflux streams, respectively, near those points at which vaporization and condensation occur along the path through the column.

10. In distillation methods wherein a column is maintained at a high degree of vacuum and a liquid reflux is established in the column countercurrent to a rising vapor stream, such reflux being generated at least in part by condensation of at least part of the vapor stream flowing substantially unimpeded through the column, the improvement which comprises supplying heat to, and abstracting heat from, the column in such manner as to cause vaporization and condensation, the vapor so formed being constrained to commingle with the main vapor stream at points such that the dew point of the vapor stream is higher than that of the added vapor, the liquid formed by condensation being constrained to commingle with the main reflux stream at such points that the bubble point of the reflux is lower than that of the added condensate.

JOHN R. BOWMAN.

REFERENCES CITED

The following references are of record in the file of this patent:

UNITED STATES PATENTS

| Number | Name | Date |
| --- | --- | --- |
| 2,078,841 | Fauth | Apr. 27, 1937 |
| 2,073,202 | Fawcett et al. | Mar. 9, 1937 |
| 1,069,829 | Thoens | Aug. 12, 1913 |
| 1,568,157 | Hess | Jan. 5, 1926 |
| 2,266,053 | Litton | Dec. 16, 1941 |
| 2,313,175 | Scott et al. | Mar. 9, 1943 |
| 1,277,931 | Heuser | Sept. 3, 1918 |
| 2,333,712 | Eckey | Nov. 9, 1943 |
| 1,418,885 | Schulze | June 6, 1922 |

FOREIGN PATENTS

| Number | Country | Date |
| --- | --- | --- |
| 467,028 | British | 1937 |

OTHER REFERENCES

Article reported in Transactions of Am. Institute of Chem. Eng. vol. 39, No. 1, Robt. M. Schaffner, John R. Bowman and James Coull.